Jan. 21, 1958    R. A. HANSEN    2,820,448
HUMIDIFIER
Filed Feb. 26, 1954    2 Sheets-Sheet 1
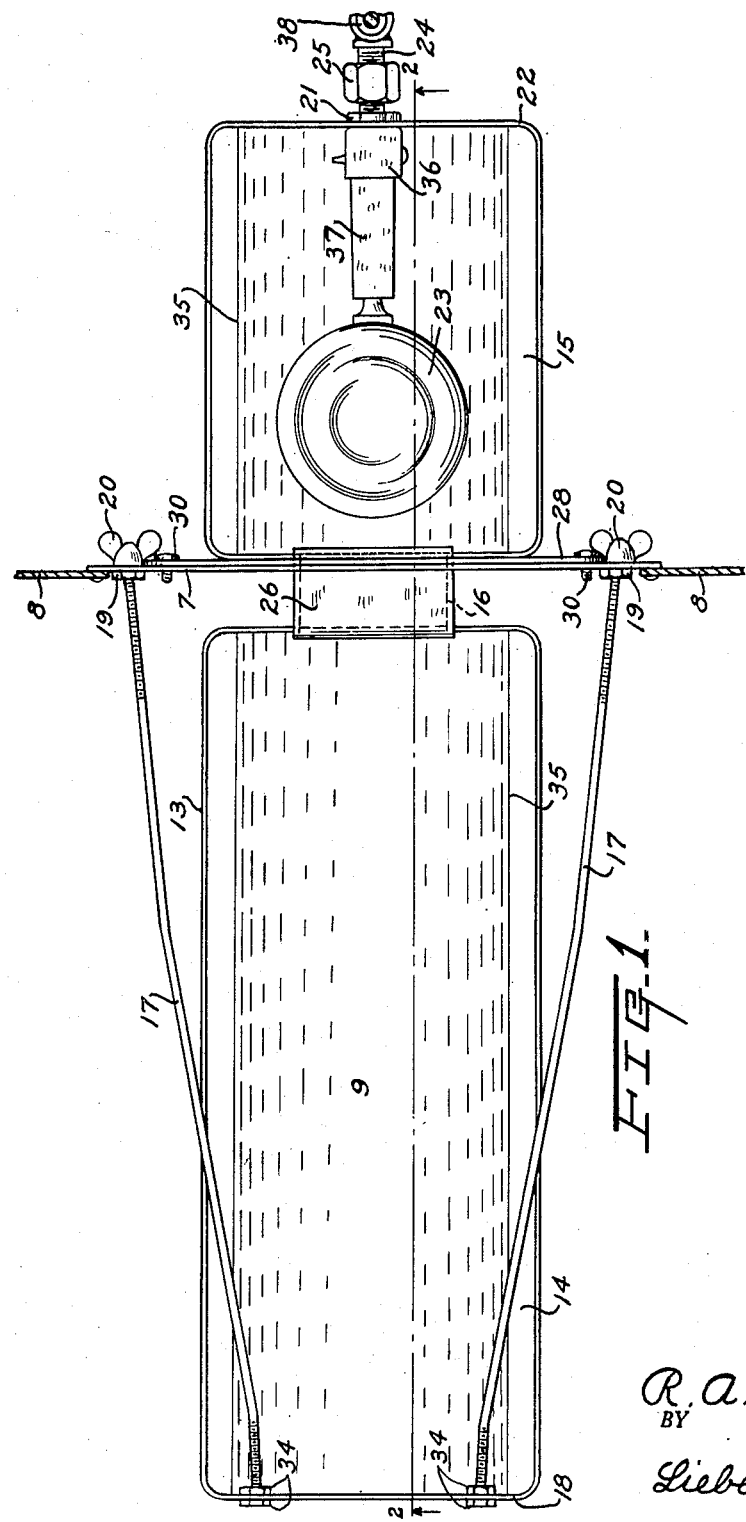
INVENTOR.
R. A. Hansen
BY
Lieber & Lieber
ATTORNEYS.

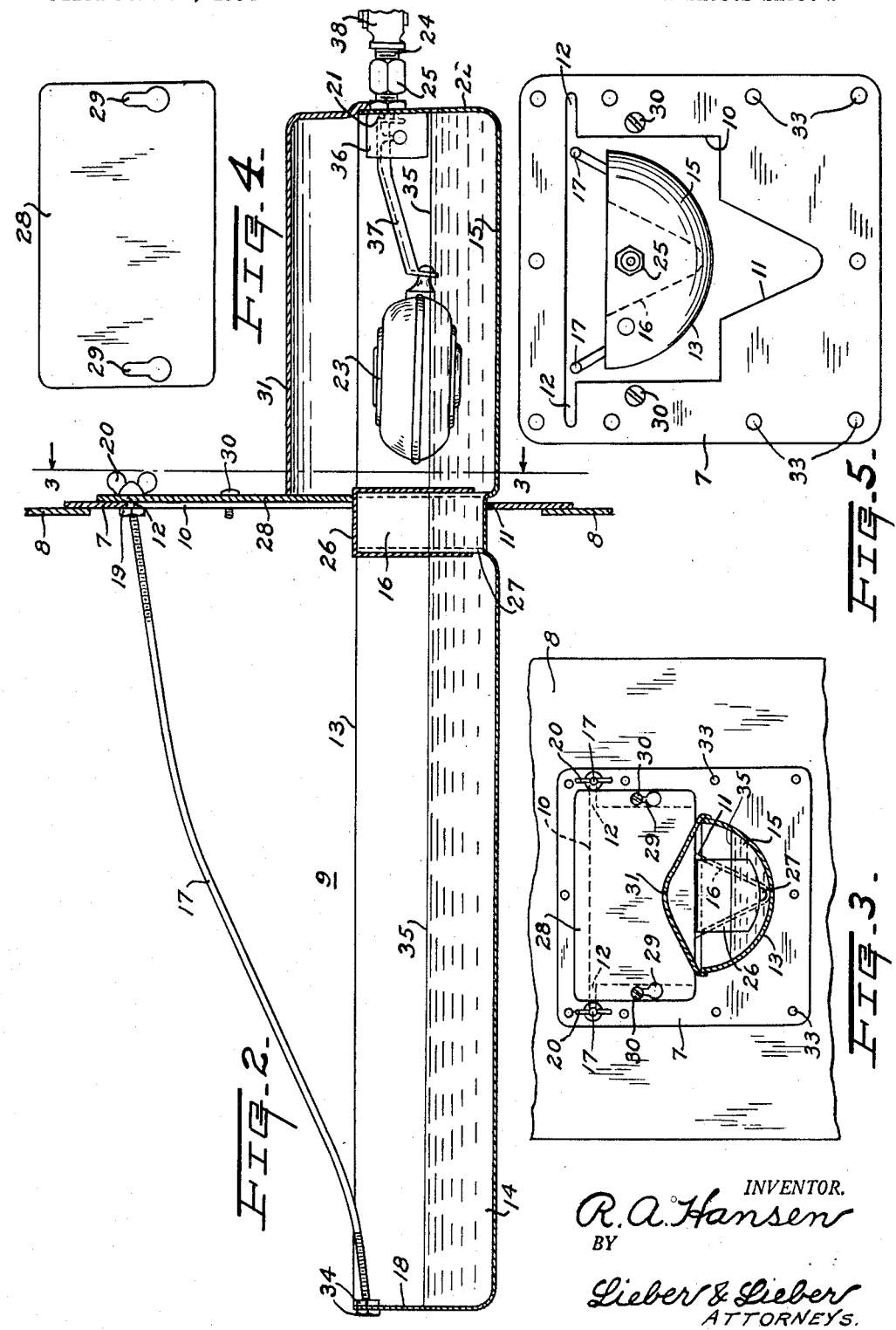

United States Patent Office 2,820,448
Patented Jan. 21, 1958

2,820,448

HUMIDIFIER

Ralph A. Hansen, Greenfield, Wis.

Application February 26, 1954, Serial No. 412,717

2 Claims. (Cl. 126—113)

This invention relates in general to improvements in the art of air conditioning, and relates more specifically to improvements in the construction and operation of air humidifying devices especially adapted for application to hot air furnaces or the like.

The primary object of my invention is to provide an improved pan type humidifier which is simple in construction and highly effective in use.

It has heretofore been common practice to add moisture to heated air being delivered from a furnace or other heater, with the aid of a humidifier comprising an elongated open horizontal pan adapted to be disposed within the hot air distribution chamber of the furnace and communicating with a source of fresh water supply located outside of the air distributing chamber and to which the water is automatically delivered by a float controlled valve. While these prior humidifying devices operated quite satisfactorily when initially properly installed, it was difficult to dispose the elongated evaporating pans thereof so as to maintain uniform liquid levels throughout their lengths, and it was also impossible to quickly and conveniently remove the pans for inspection and cleaning. The open pans of these humidifying units frequently accumulate a lot of dust and dirt which is deposited therein from the air stream, and when hard water is utilized mineral deposits often form on the pan surfaces and clog the supply passages, so that ready leveling and cleaning are important in order to maintain the humidifiers in most effective operating condition. Then too, the prior devices of this kind were too complicated and difficult and costly to manufacture and to install.

It is therefore an important object of the present invention to provide an improved humidifying unit of the above mentioned general type, which obviates the objectionable features above mentioned and which can be conveniently installed and manipulated to insure most efficient functioning at all times.

Another important object of this invention is to provide an improved open pan humidifier wherein the elongated horizontal pan can be easily and effectively leveled so as to maintain uniform depth of water throughout the entire pan length.

A further important object of the invention is to provide an improved humidifying device of the pan type, which may be quickly installed as a unit, and wherein the liquid receptacle or evaporating pan may be readily removed for inspection and cleaning without disturbing its mounting plate.

Still another important object of my invention is to provide an improved humidifying assemblage comprising few simple but sturdy parts most of which are adapted to be formed of sheet metal with the aid of punches and dies, and which may be quickly and conveniently assembled or dismantled.

An additional important object of this invention is to provide a pan type humidifier comprising a unitary elongated two-section pan of which one section is disposable within the hot air circulating and evaporating space, while the other section is located exteriorly of this space and protectively accommodates the automatic float controlled fresh water supply valve so that the latter is prevented from overheating and possible resultant gumming and clogging.

These and other more specific objects and advantages of the invention will be apparent from the following detailed description.

A clear conception of the improved features constituting the present improvements, and of the construction and operation of a commercial humidifying unit embodying the invention, may be had by referring to the drawings accompanying and forming a part of this specification in which like reference characters designate the same or similar parts in the various views.

Fig. 1 is a top view of one of the improved humidifying units showing the same supplied with water and attached to fragments of a furnace hot air circulating chamber, but with the cover of the outer pan section omitted;

Fig. 2 is a longitudinal vertical section through the same unit with the outer cover applied, the section having been taken along the line 2—2 of Fig. 1;

Fig. 3 is a transverse vertical section through the humidifier drawn to reduced scale, and the section being taken along the line 3—3 of Fig. 2;

Fig. 4 is a plan view of the closure plate of the same humidifying device, drawn to a larger scale than that of Fig. 3 but smaller than that of Figs. 1 and 2; and Fig. 5 is a plan view of the mounting plate of the same unit, drawn to the scale of Fig. 4, and showing the manner in which the pan may be removed therefrom.

While the invention has been shown and described herein as having been embodied in a unit embodying a one piece two-section sheet-metal evaporating pan having approximately semi-circular transverse cross-section, it is not my desire or intention to unnecessarily restrict the use of all of the improved features by virtue of this limited embodiment; and it is also contemplated that specific descriptive terms employed herein be given the broadest possible interpretation consistent with the disclosure.

Referring to the drawings, the improved humidifying unit shown therein comprises in general a mounting plate 7 adapted to be firmly secured to a wall 8 of a hot air circulating chamber 9, and having therein an approximately rectangular opening 10 provided with a central lower V-shaped notch 11 and with upper laterally projecting slots 12; an elongated upwardly open liquid confining pan 13 having an approximately horizontal evaporating section or basin 14 normally disposed within and projecting well into the chamber 9 away from the plate 7, and also having a shorter water supply section or basin 15 disposed outside of the chamber 9 and communicable with the section 14 through a V-shaped trough 16 which is normally swingably supported within the lower V-shaped notch 11; a pair of elongated inclined tension members or rods 17 having their lower ends secured to the end 18 of the pan 13 remote from the trough 16 while their upper ends are threaded and adjustably attached to the plate 7 at the slots 12 by means of nuts 19 and wing nuts 20; a water supply valve assembly 21 mounted upon the pan section wall 22 remote from the trough 16 and being operable by a float 23 disposed within the pan section 15, the valve assembly 21 being detachably secured to a fresh water supply line 24 by means of a coupling 25; an inverted U-shaped gate 26 cooperable with the V-shaped trough 16 of the pan 13 to provide a restricted passage 27 connecting the pan sections 14, 15; a closure plate 28 for the mounting plate opening 10 having a pair of upright suspension slots 29 therein cooperable with screws 30 carried by the plate 7; and a detachable cover 31 for the external liquid supply section 15 of the pan 13.

The wall 8 of the hot air circulating and confining chamber 9 may be either plane and vertical as shown, or it may be slightly inclined and/or curved, depending upon the particular furnace structure involved, and the mounting plate 7 is preferably formed of rather heavy sheet-metal and may be shaped to fit the chamber wall 8, being firmly secured thereto by rivets 33 as shown, or by means of bolts or by spot welding. The opening 10 in the mounting plate 7 may be of any desired shape, but must be of sufficient size to permit convenient removal of the elongated pan 13 longitudinally therethrough as illustrated in Fig. 5; and the closure plate 28 which is also preferably formed of sheet metal, should be of sufficient size and of proper shape to effectively cover the upper portion of the mounting plate opening 10. The lower portions of the slots 29 in this cover plate 28 are enlarged as shown in Figs. 3 and 4, so that they will permit the plate 28 to be removed over the heads of the screws 30 when the cover plate is lifted to bring the enlarged slot portions in alinement with the screw heads, but the screws 30 may be utilized to normally clamp the plate 28 firmly against the mounting plate 7.

The elongated pan 13 may be formed of a single blank of sheet-metal with the aid of punches and dies, and while the inner and outer sections 14, 15 are shown as being of semi-circular shape, such specific formation is not essential. The V-shaped trough 16 of the pan 13 may therefore be formed integral with the pan sections 14, 15, and normally coacts with the V-shaped notch 11 of the mounting plate 7 so that the pan 13 may be swung or tilted about this suspension notch 11 as a fulcrum. The lower ends of the pan suspension rods 17 may also be threaded and adjustably secured to the end wall 18 of the evaporating pan section 14 during initial installation of the unit, by means of clamping nuts 34, thus permitting variation of the effective lengths of the rods 17 in order to compensate for the position of the mounting plate 7 when fitted to chamber walls 8 of different inclination. The nuts 19 and thumb or wing nuts 20 which cooperate with the screw threads at the upper ends of the tension rods 17 should however be relatively adjustable to finally position the pan 13 so that the depth of the liquid 35 within the horizontal pan section 14 will be uniform throughout the entire length of the latter in the final installation, and the clamping wing nuts 20 are adapted to be quickly released whenever it is desired to remove the pan 13 from its mounting plate 7.

The inverted U-shaped gate 26 is likewise preferably formed of sheet-metal and of such shape that it will rather snugly frictionally engage the adjacent end walls of the pan sections 14, 15 when applied as shown in Figs. 1, 2 and 3, and the depending walls of this gate member should be of sufficient length to provide a relatively small but constantly open passage 27 connecting the two sections of the pan 13 as depicted in Figs. 2 and 3. The valve assembly 21 and the float 23 for automatically controlling the admission of fresh water 35 to the outer pan section 15 in accordance with the demand, are of relatively well known construction and operation, but the detachable coupling 25 is important in order to permit easy removal of the pan 13 from its supporting plate 7. The valve assembly 21 is adapted to deliver the fresh liquid into the section 15 past an anti-splash bracket 36 which also serves as a pivotal mounting for the float lever 37, and the fresh water supply pipe or line 24 may communicate with any suitable source of supply and may also be provided with a shut-off valve 38 beyond the coupling 24. The cover 31 for the pan section 15 may also be formed of sheet-metal so as to snugly frictionally engage the brim of the section 15 and the closure plate 28, and the lower edge of the latter should snugly engage the top of the gate 26 in the final assembly.

When the various parts of the improved humidifying unit have been properly constructed as above described, the mounting plate 7 may be firmly attached to a wall 8 of the hot air chamber 9 with the aid of the fasteners 33, whereupon the approximate length of the rods 17 in order to maintain the pan 13 in substantially horizontal position within the chamber 9, may be determined by adjusting the nuts 34. The pan section 14 may thereafter be inserted within the chamber 9 through the opening 10 in the mounting plate 7 as depicted in Fig. 5, and the V-shaped trough 16 may be seated within the V-shaped notch 11, whereupon the upper ends of the rods 17 may be slipped into the adjacent slots 12 and the nuts 19, 20 may be manipulated to level the pan 13 after some liquid 35 has been deposited therein. After the wing nuts 20 have been clamped in position, and the inverted U-shaped gate has been properly positioned, the coupling 25 may be utilized to connect the valve assemblage 21 to the water supply line 24 whereupon the supply valve 38 may be opened to admit fresh liquid 35. The closure plate 28 may then be suspended from the screws 30 in snug engagement with the mounting plate 7 as shown in Figs. 2 and 3, and the cover 31 may be applied to the pan section 15 to complete the installation.

The properly installed humidifier will then function to automatically supply liquid 35 at uniform depth throughout the entire length of the inner pan section 14, and the valve 38 may be adjused to insure a uniform supply of fresh liquid. The cover 31 may be quickly removed at any time in order to permit inspection of the float section 15 of the pan 13, and the relatively small passage 27 produced by the gate 26 prevents hot liquid from flowing into the pan section 15 from the evaporating pan section 14. By merely lifting the cover plate 28 and thereafter removing it from the screws 30, the inner pan section 14 will be accessible for inspection and necessary adjustment of the liquid level, and upon release of the wing nuts 20 and removal of the upper rod ends from the slots 12, the entire pan 13 may be readily longitudinally removed from the mounting plate 7 through the opening 10 as illustrated in Fig. 5, for thorough inspection and cleaning.

From the foregoing detailed description of the construction, installation and operation of the device, it should be apparent that the present invention provides a simple, compact and durable humidifying unit which can be manufactured at moderate cost primarily of sheet-metal, and readily installed in hot air circulating chambers 9 having upright or inclined supporting walls 8. The elongated internal evaporating pan section 14 is effectively segregated from the external water supply section 15 in order to avoid gumming and sticking of the supply valve, and the pan 13 may be conveniently adjusted to insure most effective distribution of the liquid within the section 14. The mounting plate 7 may be permanently and rigidly attached to the furnace wall 8 to provide a firm support for the pan 13 but the latter may be conveniently removed for inspection and cleaning, and re-applied to the supporting plate. The improved inverted gate 26 is also easily removable without necessarily removing the pan 13, and the improved units may be produced in various sizes for diverse uses, and are exceedingly flexible in their adaptations and readily accessible and adjustable.

It should be understood that it is not desired to limit this invention to the exact details of construction and operation of the humidifier herein specifically shown and described, for various modifications within the scope of the appended claims may occur to persons skilled in the art.

I claim:

1. A humidifier unit applicable to a hot air circulating chamber wall having an opening therein, and comprising, a mounting plate for the unit attachable to the chamber wall to provide a closure for the wall opening and having therein a smaller opening bounded at its lower portion by a downwardly extending V-shaped notch, an elongated approximately horizontal pan having a reduced V-shaped medial portion pivotally cooperable with said notch and being provided with liquid supply and evaporating basins adapted to extend outwardly and inwardly respectively relative to said mounting plate and the air chamber, a pan leveling tension rod above said pan having one end permanently attached to the free end of said evaporating pan basin and its opposite end adjustably attached to said plate, an inverted U-shaped gate having a top wall spanning and coacting with the upper edges of said reduced pan portion and also having depending side walls extending transversely of said V-shaped pan portion and coacting with the adjacent end walls of the basins, and a closure for said mounting plate opening detachably secured to the mounting plate and coacting with said gate to hold the latter in position.

2. A humidifier unit applicable to a hot air circulating chamber wall having an opening therein, and comprising, a mounting plate for the unit attachable to the chamber wall to provide a closure for the wall opening and having therein a smaller opening bounded at its lower portion by a downwardly extending V-shaped notch, an elongated approximately horizontal pan having a reduced V-shaped medial portion pivotally cooperable with said notch and being provided with liquid supply and evaporating basins adapted to extend outwardly and inwardly respectively relative to said mounting plate and the air chamber, a pan leveling tension rod above said pan having one end permanently attached to the free end of said evaporating pan basin and its opposite end adjustably attached to said plate, and an inverted U-shaped gate having a top wall spanning and coacting with the upper edges of said reduces pan portion and also having depending side walls extending transversely of said V-shaped pan portion and coacting with the adjacent end walls of the basins to produce a restricted passage connecting the bottoms of said basins.

References Cited in the file of this patent

UNITED STATES PATENTS

| | | |
|---|---|---|
| 1,102,480 | Davis | July 7, 1914 |
| 1,345,344 | Blandford | July 6, 1920 |
| 1,692,816 | Chamberlin | Nov. 27, 1928 |
| 2,049,731 | Betts | Aug. 4, 1936 |
| 2,557,042 | Woolley | June 12, 1951 |
| 2,565,210 | Dovolis | Aug. 21, 1951 |
| 2,585,764 | Getz | Feb. 12, 1952 |